United States Patent [19]

Lambot

[11] 4,273,200
[45] Jun. 16, 1981

[54] DRIVE MANDREL FOR A DRILLING STEM

[75] Inventor: Joseph H. Lambot, Wauthier-Braine, Belgium

[73] Assignee: Diamant Boart, Brussels, Belgium

[21] Appl. No.: 69,410

[22] Filed: Aug. 24, 1979

[30] Foreign Application Priority Data

Aug. 25, 1978 [BE] Belgium ................................ 190067

[51] Int. Cl.³ ...................... B23B 31/30; E21B 11/00; E21C 9/00
[52] U.S. Cl. .............................. 173/166; 24/263 DA; 279/4
[58] Field of Search .................. 279/4, 121; 24/263 B, 24/263 D, 263 DA; 173/166, 149

[56] References Cited

U.S. PATENT DOCUMENTS

| 3,212,591 | 10/1965 | Tucker | 173/149 |
| 3,301,334 | 1/1967 | Odgers et al. | 173/43 |
| 3,692,320 | 9/1972 | Lindelof et al. | 279/4 |
| 3,992,019 | 11/1976 | Crawshay | 279/4 |
| 4,196,914 | 4/1980 | Kutman et al. | 279/4 |

Primary Examiner—Robert D. Baldwin
Attorney, Agent, or Firm—Sughrue, Rothwell, Mion, Zinn and Macpeak

[57] ABSTRACT

The invention relates to a drive mandrel for a drilling stem. The mandrel comprises a tubular element traversed by the drilling stem and having openings for the passage of jaws urged against the stem under the action of wedges. The wedges are spring biased against the jaws, and repelled from said jaws by hydraulic thrust. The wedges are mounted on an axially adjustable flange.

5 Claims, 1 Drawing Figure

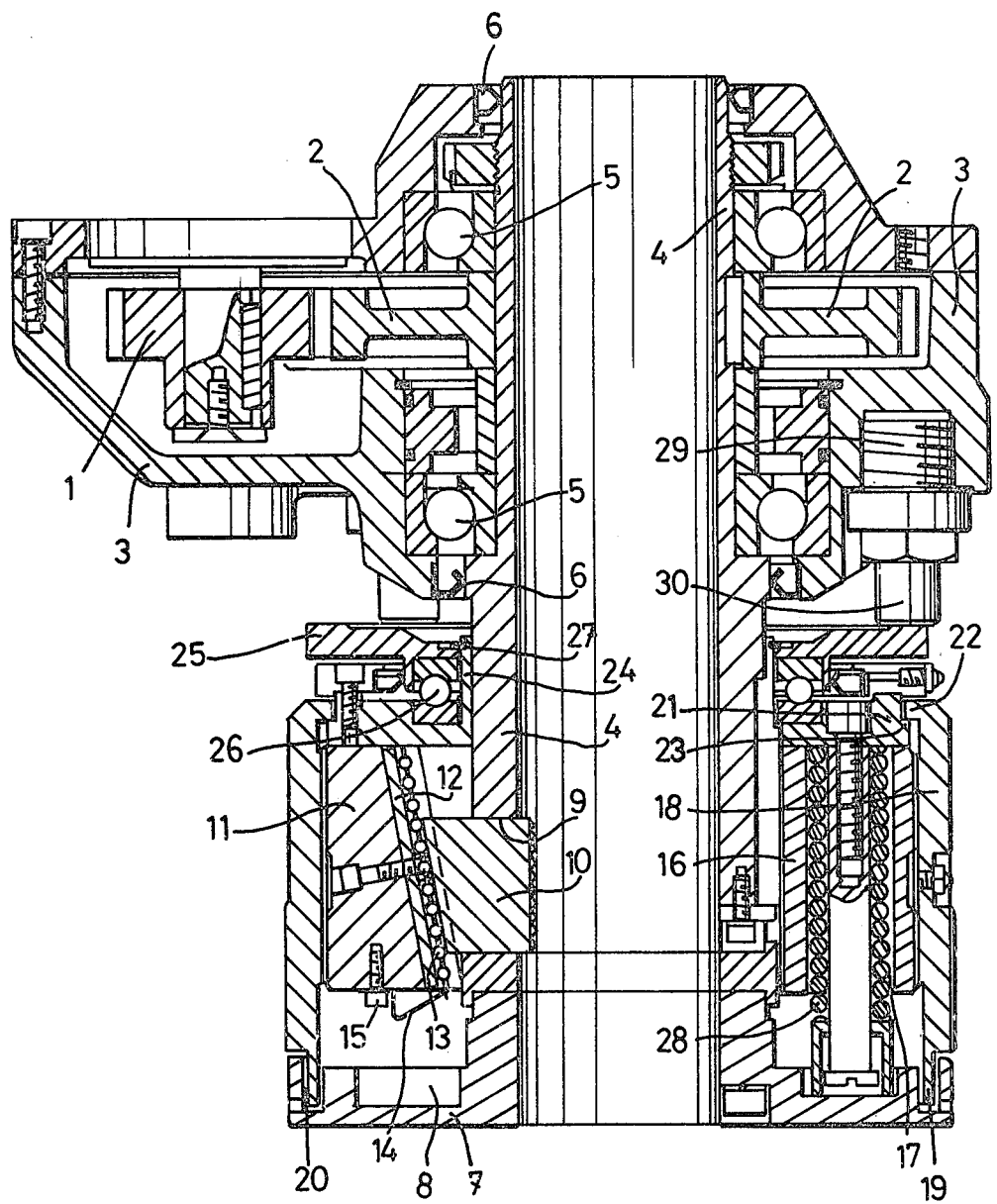

DRIVE MANDREL FOR A DRILLING STEM

The present invention relates to a drive mandrel for a drilling stem.

In substance, the drive mandrel comprises a tubular element intended to coaxially surround the drilling stem. The tubular element turns around its axis under the action of the drive motor for rotating the drilling stem. The tubular element has openings for the passage of several jaws for gripping the drilling stem. The jaws are jointly rotatable with the tubular element and can be applied radially against the drilling stem, under the thrust of wedges activated upwardly by springs. The wedges also turn jointly with the tubular element and slide axially downward under the control of a hydraulic thrust counter to the springs.

In known mandrels of this type, the jaws are mounted on a sleeve lodged into a hydraulic cylinder capable of producing the thrust. When activated, the hydraulic cylinder traversed by the drilling stem is rotatable around said drilling stem. The body of the hydraulic cylinder has interior slanting surfaces against which the jaws are guided during their axial sliding. Additionally, the piston of the hydraulic cylinder can be applied on the upper surface of the jaws to ensure their axial movement downward, counter to spring washers which are superposed and threaded along a stem extending between said piston and a flange of the sleeve. Moreover, the supply of fluid under pressure to the hydraulic cylinder is provided for at the upper part of the cylinder above the piston.

Known drive mandrels have disadvantages. These mandrels have no possibility for adjustment of the initial position of the jaws in terms of the drilling stem. More specifically, these same mandrels do not allow adjustment of the initial position of the jaws in relation to the drilling stem. The result is that the user of the drilling core sampler must take down the jaws in order to allow the passage of the core sampler and the sleeve, and there is no possibility of compensating for the wear of these jaws.

There are also analogous mandrels which are exclusively mechanical. In these other known mandrels, the jaws are mounted on a ring fitted into a housing. In use, the ring traversed by the drilling stem also turns with said stem. This ring itself has mobile wedges to ensure the radial movement of the jaws under the action of mechanical screw jacks incorporated into the housing which develop a mechanical thrust rather than a hydraulic thrust.

The other known mechanical mandrels which are especially cumbersome and complicated also do not have any possibility for adjusting the initial position of the jaws in relation to the drilling stem. Moreover, these mandrels need considerable operation time.

In the new mandrel, however, the wedges form part of an externally threaded ring with openings for the passage of springs. These springs rest at the bottom against a flange of the tubular element. The ring is axially screwed in an adjustable manner in a cylinder arranged above the flange. The cylinder is attached at its top to a lower annular plate fitted on the tubular element. The assembly of the sleeve, the cylinder and the lower plate turn jointly with the tubular element beneath an upper non-rotating annular plate. This upper plate is placed around the tubular element, using a bearing ring mounted between the two plates. The assembly comprising the sleeve, the cylinder, the two plates and the bearing ring is biased to slide axially upwards by springs. These springs take support at the top, like the wedges, against the lower annular ring. This assembly may slide downwardly against these springs, under the effect of the hydraulic thrust applied to the non-rotating upper plate and transmitted to the wedges by the bearing ring and the lower plate.

In order to improve the water-tightness of the cylinder and of the circular flange of the tubular element of the new mandrel, the lower edge of this cylinder is axially movable within a corresponding groove of the circular flange.

According to a simplifying characteristic of the new mandrel, the lower plate is extended upwardly by a sleeve around which are mounted the bearing ring and the upper plate, which are held there by a "circlips" or the like around said sleeve.

In order to facilitate the sliding of the jaws against the wedges of the new mandrel, each jaw is held in place against the corresponding wedge by means of a needle bearing plate. Preferably, the plate is mounted on the wedge by means of a spring blade fixed to the large base of said wedge located on the opposite side of the drive motor.

Known hydraulic mandrels maintain the jaws pressed against the stem under the effect of hydraulic pressure. The result is that in the case of a loss of pressure the stem is released and can then slide within the mandrel, which could constitute a very serious danger. Additionally, this requires a large diameter bearing shoulder which remains constantly under strong restraint since the non-turning cylinder has to transmit the hydraulic thrust to the turning mandrel.

With the new mandrel these disadvantages can be efficiently remedied, and for this purpose the hydraulic thrust for releasing the jaws from the drilling stem is provided by several fixed hydraulic screw jacks thrusting the plate and thus the wedges downwards counter to the springs.

According to a construction characteristic of the new mandrel, the hydraulic jacks are mounted on the fixed housing of the power transmission means for rotating the drilling stem, with their piston stems bearing against the upper plate.

Other details and special characteristics of the invention will become apparent during the description of the drawing attached to the present application which schematically represent as an example only one embodiment of the invention.

The single drawing shows a partial vertical cross-section of one embodiment of a new drive mandrel.

The mandrel shown provides for the rotation of a drilling stem around its longitudinal axis.

The drilling stem is set in rotation under the action of a hydraulic drive motor. A cog wheel 1 engaging with a cog wheel 2 turning inside a housing 3 is wedged onto the output shaft of the drive motor. The cog wheel 2 is in turn wedged onto a tubular element 4 which is rotatable inside the housing 3 on ballbearings 5 and which extends considerably downwards from the housing 3. Sealing rings 6 are provided at the top and bottom inside the walls of the housing 3 around the tubular element 4.

The bottom extremity of the tubular element 4 comprises a flange 7 which has cavities 8 directed upwardly and evenly distributed.

In operation, the tubular element 4 is traversed coaxially by the drilling stem and turns under the action of the motor without sliding axially.

Above the flange 7, the tubular element 4 has openings 9 for the passage of jaws 10 which are capable of radially pressing the drilling stem. The jaws 10 turn simultaneously with the tubular element 4 and rotate the drilling stem when they are pressed against it. Preferably three jaws 10 are arranged and evenly distributed around the axis of the tubular element 4.

Each jaw 10 is movable radially through the opening 9. For this purpose, each jaw 10 cooperates with a wedge 11 which is axially movable above the flange 7. Like the jaw 10, the wedge 11 turns simultaneously with the tubular element 4.

Each jaw has a slanting external surface, whereas the wedge 11 has an internal surface parallel to this external surface. The slanting surface of the wedge 11 is lined with a covering flange 12. Between said surfaces is arranged a needle bearing plate 13 which constitutes the intermediary mechanical element by which the jaws 10 take support against the wedges 11. The plate 13 is mounted on the wedge 11 by means of a spring blade 14 fixed by bolts 15 to the large lower base of the wedge 11.

The wedges 11 are part of an annular sleeve 16 which is threaded externally and which has evenly distributed vertical openings 17. The sleeve 16 is screwed axially in an adjustable manner into a cylinder 18 which is threaded over a large part of its height. The cylinder 18 is placed above the flange 7 and its lower edge 19 is constantly engaged in a circular groove 20 of the flange 7, capable of sliding axially or vertically therein.

The cylinder 18 is attached at the top to a lower annular plate 21 and for this purpose its upper edge has an interior rim 22 which fits into a circular shoulder piece 23 of the lower plate 21. The lower plate 21 is extended upwardly by a sleeve 24 which is integral with it. The lower plate 21 with its sleeve 24 is wedged onto the tubular element 4 and turns with said element but can slide axially.

The assembly of the sleeve 16, the cylinder 18 and the lower plate 21 turns simultaneously with the tubular element 4 beneath an upper annular plate 25 which can be rendered immovable and which can be non-rotating on account of a bearing ring 26 arranged between the two plates 21 and 25. The bearing ring 26 and the upper plate 25 are mounted around the ring 24 and are held in place there axially in relation to the lower plate 21 by a "circlip" 27 or the like carried by the upper part of the ring 24.

The assembly of the sleeve 16, the cylinder 18, the two plates 21 and 25 and the bearing ring 26 slide axially upwardly to ensure the radial gripping of the drilling stem by the jaws 10. This upward sliding is provided by helical springs 28 arranged respectively in the vertical openings 17 of the sleeve 16. The springs 28 take support at the bottom against the flange 7 of the tubular element 4 and for this purpose their lower extremities rest on the bottom of the cavities 8 in which they are housed. Additionally, the springs 28 take support at the top against the lower plate 21. Also the wedges 11 take support against the upper plate 21 by means of the cylinder 18. In this way, the springs 28 which are precompressed on mounting between the lower plate 21 and the flange 7 elastically bias the assembly upwardly and thus also move the wedges 11 upwardly to force the jaws 10 to be moved radially towards the axis of the tubular element 4 and to be applied and pressed sufficiently against the drilling stem.

The assembly of the sleeve 16, the cylinder 18, the two plates 21 and 25 and the bearing ring 26 slide axially downward counter to the springs 28 to provide the radial release of the drilling stem by the jaws 10. This downward sliding is produced by several fixed hydraulic screw jacks 29 which exercise downwardly directed hydraulic thrusts. In the embodiment shown, the piston stems 30 of the hydraulic screw jacks 29 are applied against the upper plate 25 and repel the plate downwardly, and together with it the last mentioned assembly. In this manner, at the time of the simultaneous operation of the hydraulic screw jacks 29, the wedges 11 are driven downwardly. The result is that the jaws 10 no longer grip the drilling stem, which is thus liberated from the drive motor.

The bodies of the hydraulic screw jacks 29 are joined to the fixed housing 3 of the transmission means for the rotation of the drilling stem.

The drive mandrel described is thus mechanically uncomplicated and uncumbersome. In addition, the mandrel is easily taken down and its component parts are easily accessible. Moreover, its hydraulic components are not enclosed in a casing.

To drive the drilling stem, the operating mandrel is first activated to ensure the application and the pressing of the jaws 10 on the drilling stem. For this purpose, the hydraulic screw jacks 29 are activated to simultaneously raise their piston stems 30 as well as the wedges 11. Then the motor 1 is started. To disengage the drilling stem, the opposite is done.

It is obvious that the invention is not exclusively limited to the form of execution shown and that many modifications may be made in the form, the arrangement and the composition of certain of the elements entering into its execution provided that these modifications are not contrary to the subject matter of each of the following claims.

I claim:

1. A mandrel for driving a drilling stem comprising:
   a fixed housing (3) traversed during use by the drilling stem,
   transmission means (1, 2) mounted within the fixed housing (3) and mechanically coupled to a drive motor for the drilling stem,
   a tubular element (4) coaxially traversed during use by the drilling stem, mechanically coupled to the transmission means (1, 2) and mounted for rotation around its axis in the fixed housing (3), and projecting below the fixed housing (3),
   a circular flange (7) integral with the lower projection of the tubular element (4), and extending radially outwardly therefrom,
   openings (9) provided in the tubular element (4), above the flange (7) and below the fixed housing (3) and evenly distributed around the axis of the tubular element (4),
   an upper annular plate (25) surrounding the tubular element (4) below and close to the fixed housing (3), and capable of being immobilized in relation to the tubular element (4),
   a lower annular plate (21) surrounding the tubular element (4) below the upper plate (25), mounted on the tubular element (4), axially slidable along the tubular element (4), and rotatable together with the tubular element (4), a bearing ring (26) surrounding the tubular element (4) between the upper plate (25) and the lower plate (21) and in contact with said plates (25) and (21), axially slidable along the tubular element (4), and rotatable in part together with the tubular element (4), a cylinder (18) surrounding the lower part of the tubular element (4) at a distance from said element, placed above the flange (7), threaded internally, fastened at the top to the lower plate (21), axially slidable along the tubular element (4), and rotatable together with the lower plate (21), a sleeve (16) surrounding the lower part of the tubular element, above the flange (7), threaded externally, and axially screwed in an adjustable manner into the cylinder (18), jaws (10) disposed in corresponding apertures in the sleeve (16), extending through the openings (9) of the tubular element (4), radially slidable in the apertures and openings (9), bearing in use against the drilling stem, and rotatable together with the sleeve (16), wedges (11) supported by the sleeve (16), cooperating with the jaws (10), slidable upwardly, bearing against the lower plate (21), and rotatable together with the sleeve (16), springs (28) disposed in cavities (17) of the sleeve (16) bearing at their lower sides against the flange (7), bearing at their upper sides against the lower plate (21) and biasing it upwardly, and rotatably together with the sleeve (16), fixed hydraulic screw jacks (29) mounted on the fixed housing (3), evenly distributed around the axis of the tubular element (4), and having piston rods (30) bearing against the upper plate (25), the assembly of the tubular element (4), the jaws (10), the wedges (11), the springs (28), the sleeve (16), the cylinder (18), the lower plate (21) and part of the bearing ring (26) thus turning around the axis of the drilling stem under the action of the drive motor of the drilling stem and by the intermediary of the transmission means, said assembly driving the drilling stem by the jaws (10) gripping it, and the assembly of the sleeve (16), the wedges (11), the lower plate (21), the bearing ring (26) and the upper plate (25) being slidable along the axis of the drilling stem, upwardly under the action of the springs (28) and downwardly against said springs (28) under the effect of the thrust of the hydraulic screw jacks (29), the wedges (11) pushing the jaws (10) against the drilling stem by the springs (28), and releasing said jaws (10) from the drilling stem due to the hydraulic screw jacks (29).

2. The drive mandrel of claim 1, wherein a lower edge (19) of the cylinder (18) is movable axially in a corresponding groove (20) of the flange (7) of the tubular element (4).

3. The drive mandrel of claims 1 or 2, wherein the lower plate (21) is extended upwardly by a sleeve (24) around which are mounted the bearing ring (26) and the upper plate (25), which are held in place by a "circlip" (27) or the like on said sleeve (24).

4. The drive mandrel of any of claims 1 to 3, wherein each jaw (10) is supported against a corresponding wedge (11) through the intermediary of a bearing plate (13).

5. The drive mandrel of claim 4, wherein the bearing plate (13) is mounted on the wedge (11) by a spring blade (14) fixed to the base of the wedge (11) on the opposite side from the drive motor.

* * * * *